US012123698B1

(12) United States Patent
Courteville et al.

(10) Patent No.: US 12,123,698 B1
(45) Date of Patent: Oct. 22, 2024

(54) METHOD AND A SYSTEM FOR CHARACTERIZING STRUCTURES THROUGH A SUBSTRATE

(71) Applicant: UNITY SEMICONDUCTOR, Montbonnot-Saint-Martin (FR)

(72) Inventors: Alain Courteville, Congenies (FR); Michael Schöbitz, Grenoble (FR); Wolfgang Alexander Iff, Domène (FR)

(73) Assignee: UNITY SEMICONDUCTOR, Montbonnot-Saint-Martin (FR)

( * ) Notice: Subject to any disclaimer, the term of this patent is extended or adjusted under 35 U.S.C. 154(b) by 0 days.

(21) Appl. No.: 18/739,436

(22) Filed: Jun. 11, 2024

(30) Foreign Application Priority Data

Aug. 21, 2023 (EP) ..................................... 23306400

(51) Int. Cl.
  *G01B 11/02* (2006.01)
  *G01B 11/26* (2006.01)
(52) U.S. Cl.
  CPC .............. *G01B 11/02* (2013.01); *G01B 11/26* (2013.01); *G01B 2210/56* (2013.01)
(58) Field of Classification Search
  None
  See application file for complete search history.

(56) References Cited

U.S. PATENT DOCUMENTS

| 7,782,468 B2 * | 8/2010 | Courteville | ........ G01B 11/0608 356/521 |
| 2006/0192978 A1 * | 8/2006 | Laguarta Bertran | .. G01B 11/12 356/601 |
| 2009/0051932 A1 * | 2/2009 | Heiden | .................. G01B 11/03 356/614 |
| 2020/0284883 A1 * | 9/2020 | Ferreira | ............... H04N 25/773 |
| 2023/0377121 A1 * | 11/2023 | Iff | .............................. G06T 7/60 |

FOREIGN PATENT DOCUMENTS

JP  2001203424 A  7/2001

OTHER PUBLICATIONS

European Search Report received for Application No. 23306400.5, dated Jan. 24, 2024.

* cited by examiner

*Primary Examiner* — Brandi N Hopkins
*Assistant Examiner* — Nigel H Plumb
(74) *Attorney, Agent, or Firm* — Greer, Burns & Crain, Ltd

(57) ABSTRACT

A method for characterizing a structure etched in a first substrate surface, the structure extending along a longitudinal direction, z, into the substrate, the method implemented by a system including a light source emitting an illumination beam with a wavelength transmitted through the substrate, and an imaging device positioned to face a second substrate surface opposite the first surface, the method including illuminating at least one structure with the illumination beam, subsequently positioning an object plane of the imaging device at at least two different longitudinal positions; acquiring at least one image of the structure at each of the longitudinal positions, the images being acquired through the substrate; measuring data relating to a lateral dimension of the structure from each acquired image at each of the longitudinal positions; and determining longitudinal data relating to a longitudinal shape of the structure from the lateral data of at least two longitudinal positions.

15 Claims, 4 Drawing Sheets

METHOD AND A SYSTEM FOR CHARACTERIZING STRUCTURES THROUGH A SUBSTRATE

BACKGROUND

The present invention relates to a method for characterising structures, and in particular high aspect ratio structures etched in a substrate. It also relates to a system implementing such a method.

The field of the invention is the field of the inspection and the characterization of structures etched in a substrate, such as high aspect ratio structures, for example Through-Silicon Vias (TSV) or trenches, etched in a substrate, such as a semiconductor wafer.

In the semiconductor industry, or in the MEMS (for "Microelectromechanical systems") industry, many process steps involve etching structures with sometimes high aspect ratios in substrates such as silicon.

Such structures with high aspect ratio, "HAR structure" in the following, may comprise for instance Through Silicon Vias (TSVs) which are usually blind holes used for example for interconnections in advanced packaging techniques, trenches with narrow width and elongated length, and more complex features. They may be realized by Deep Radiative Ion Etching (Deep RIE) or photolithography techniques for instance.

The aspect ratio of an HAR structure is defined by the ratio between the depth and a lateral dimension, also called "critical dimension" (CD), of the HAR structure. Some HAR structures may have aspect ratios larger than 10 or 20, with lateral (critical) dimensions as narrow as 5 µm or less. Some non-limitative examples comprise TSVs in the form of cylindrical holes with diameters of 2-3 µm and depths of 30-50 µm, etched in silicon substrates.

For narrow TSVs with high aspect ratios, such as with 3 µm diameter and 40-50 µm depth, or 2 µm diameter and 30-40 µm depth, the etching process may result in TSVs having a diameter or a cross section which varies with depth. Most frequently, that cross section decreases with depth, along the walls and/or in the neighbourhood of the bottom, so that the TSV has a smaller diameter at the bottom than at the top.

In later process steps, the TSVs are usually filled with metal to realize interconnections, and the substrate is ground and polished from the back side until the metal at the bottom of the TSV is revealed. If the diameter of the TSV is diminishing with depth, this may result in connection lines having an excess resistivity.

Therefore, there is a need to measure the profile along the height of the TSVs or other high AR structures, to verify if the etching process is satisfactory or not.

SUMMARY

A purpose of the present invention is to overcome at least one of the drawbacks of the known techniques.

A purpose of the present invention is to propose a device and a method for characterizing cross-sections of high-aspect ratio structures such as TSVs or trenches as a function of their depth.

Another purpose of the invention is to propose a device and a method for measuring the inclination of lateral walls, or taper angles, along high-aspect ratio structures.

Another purpose of the invention is to propose a device and a method for characterizing isolated or single HAR structures and for characterizing HAR structures individually.

Another purpose of the invention is to provide a solution to characterize structures, and in particular HAR structures of small critical dimension.

It is also a purpose of the present invention to provide a solution to characterize structures, and in particular HAR structures more efficiently and/or faster.

At least one of these aims is achieved by a method for characterizing a structure etched in a first surface of a substrate, such as a wafer, said structure extending along a longitudinal direction, z, into the substrate, the method being implemented by a characterizing system comprising a light source configured to emit an illumination beam with a wavelength adapted to be transmitted through the substrate, and an imaging device positioned to face a second surface of the substrate opposite to the first surface, the method comprising the following steps:

- illuminating at least one structure with the illumination beam,
- subsequently positioning an object plane of the imaging device at at least two different longitudinal positions;
- acquiring at least one image of the structure at each of the longitudinal positions, the images being acquired through the substrate;
- measuring at least one lateral data relating to a lateral dimension of the structure from the at least one acquired image at each of the longitudinal positions; and
- determining at least one longitudinal data relating to a longitudinal shape of the structure from the lateral data of at least two longitudinal positions.

The method according to the present invention proposes measuring longitudinal data relating to structures, and in particular HAR structures etched in a substrate, thanks to an imaging device positioned on a side of the substrate opposite to the side bearing the structures, and by processing at least two images captured by this imaging device at different depths of the structure. The longitudinal data represent a valuable information when characterizing these structures. In particular, the longitudinal data are useful to evaluate the evolution of the diameter, cross section, or width of the structure along its depth. The lateral dimensions of the structure may indeed vary with depth, in particular near the bottom of the structure. The longitudinal data are particularly useful in order to check the conformity of the etching process of the structure.

The method according to the present invention is implemented using a light source emitting light with at least a wavelength, or a wavelength range, adapted to be transmitted through the material of the substrate. Thereby, imaging of the structure is realized through the substrate, from the side of the substrate opposite to the side bearing the structures. The lateral data of the structure can then be obtained from acquired images, by applying any known image processing method, such as image segmentation, feature extraction, edge detection, or identification or blob detection. It can also be obtained by comparison with known reference images, possibly using a deep learning-based technique.

In the present document, a "high aspect ratio structure" or "HAR structure" designates a structure with an aspect ratio greater than, or equal to, 5, or 10, or even 20.

For example, a structure such as a HAR structure may be a Through Silicon Via (TSV), a trench, and a more complex feature, etched in a substrate such as a wafer.

In the present document, a substrate may designate any substrate used in the semiconductor or MEMs industry, of any shape and any material, at any stage of the process where HAR structures are present. Examples of such substrates are circular wafers, rectangular or square panels, compound substrates, dies, . . . the first surface of a substrate corresponds to the side or to the surface on which the structure(s) are etched. It is also referred to in the following as the "top", "top side", or "top surface". The second surface corresponds to the side of the substrate opposite to the first surface. It is also referred to as the "bottom", "bottom side", or "bottom surface". Further, the term "bottom of a structure" designates the bottom of a via, a trench, or any other etched or recessed structure, or in other words, the deepest part of the structure in the substrate.

A structure as measured by the invention extends along a longitudinal direction z into the depth of the substrate. So, the longitudinal direction can correspond for instance to a direction perpendicular to the first surface.

In the present document, "a lateral dimension of the at least one structure" may designate:
- a diameter or a cross section of a hole or a via (TSV),
- the width of a trench, or
- any dimension within or between various pattern elements of an etched structure.

The lateral data relating to a structure may be deduced from a single image captured by the imaging device for a given longitudinal position. Alternatively, or in addition, the lateral data relating to a structure may be deducted from several images captured by the imaging device for said given longitudinal position.

In the same way, the lateral data relating to several structures may be captured sequentially, or simultaneously, for instance if they are imaged in the same field of view of the imaging device.

According to an embodiment, the step of determining at least one longitudinal data may comprise a step of determining a taper angle of at least one lateral wall of the at least one structure.

Alternatively, or additionally, the step of determining at least one longitudinal data may comprise a step of determining a profile of the at least one structure in the longitudinal plane.

The expression "longitudinal shape of the at least one structure" may thus designate a taper angle of a lateral wall or lateral walls of the structure. In this case, it is assumed that the wall or walls are straight at least in the part of the structure which is measured. To measure such taper angle, it is necessary to acquire lateral data at at least two longitudinal positions separated by a known distance, but it is not mandatory to know the location of these two longitudinal positions with respect to the first surface or the bottom of the structure.

It may also designate a profile, and in particular a longitudinal-section profile of the structure or a part of the structure. This is particularly useful in case the wall or walls of the structure are curved or non-straight, and to verify the shape of the profile near the bottom of the structure, where the etching process may be less efficient.

According to an embodiment, the method of the present invention may further comprise a step of positioning the object plane of the imaging device at a bottom of the at least one structure.

Alternatively or additionally, the method of the present invention may further comprise a step of positioning the object plane of the imaging device at a top of the at least one structure.

In particular, for a profile measurement, the knowledge of the start and/or end points of the structure may be necessary.

According to an embodiment, the method may further comprise:
- moving the object plane along the z direction;
- acquiring an image or a sequence of images of the object plane at different positions of the object plane along the z direction; and
- identifying at least one image of the bottom or the top of the at least one structure, acquired with the object plane positioned at the bottom or the top of the at least one structure.

This scanning phase allows notably for searching and identifying the image of the bottom or the top out of images of other parts of the structure or the substrate.

The scan may be realized following a depth direction within the HAR structure, starting for instance from the top surface of the substrate.

The scan may also be realized within the substrate, starting for instance from the bottom surface of the substrate towards the bottom of the HAR structure.

The step of identifying at least one image of the bottom or the top comprises at least one of the following steps:
- detecting a transition in the sequence of images between the at least one structure and the environment of the structure,
- measuring the sharpness or the local spatial frequencies of the acquired images.

Of course, other image processing techniques may be employed to identify an image of a bottom or a top of the structure.

According to an embodiment, the step of measuring at least one lateral data may comprise a step of identifying in an image of the structure at least one of the following: an area corresponding to the interior of the structure, a location of its walls, a transition between the structure and the substrate.

The structure is defined as an empty space in the substrate (the interior) surrounded by walls. This can be achieved using well-known image processing techniques such as segmentation, based for instance on a gray level analysis, pattern detection to identify the structure in the image, dimension/shape measurements, edge detection, blob analysis . . . .

According to another aspect of the same invention, it is proposed a system for characterizing a structure etched in a first surface of a substrate, such as a wafer, said structure extending along a longitudinal direction, z, into the substrate, the system comprising:
- at least one light source for illuminating the structure, the at least one light source emitting light of a wavelength adapted to be transmitted through the substrate;
- an imaging device positioned to face a second surface of the substrate opposite to the first surface;
- a focus controller for subsequently positioning an object plane of the imaging device at at least two different longitudinal positions, and acquire with the imaging device at least one image of the structure at each of the longitudinal positions through the substrate; and
- an image processing device for:
  - measuring at least one lateral data relating to a lateral dimension of the at least one structure from the at least one acquired image at each of the longitudinal positions; and
  - determining at least one longitudinal data relating to a longitudinal shape of the at least one structure from the lateral data of at least two longitudinal positions.

In some embodiments, the at least one light source may be positioned to face the second surface of the substrate, corresponding to the bottom side.

In this case, the illumination of the structure is done in reflection.

Alternatively, or additionally, the at least one light source may be positioned to face the first surface of the substrate, corresponding to the top side.

In this case, the illumination of the structure is done in transmission.

For both illumination schemes, the at least one image has to be acquired through the substrate, so the at least one light source shall have wavelengths able to be transmitted through this substrate.

As an example, in the case of a silicon substrate, the light source shall have a spectrum in the infrared, with wavelengths longer than 900 nm or 1000 nm.

According to an embodiment, the imaging device may comprise a camera and optical imaging lenses. The camera must be, of course, sensitive to the wavelengths transmitted through the substrate.

The at least one light source, for illumination in transmission or in reflection, may be positioned in a bright field configuration with an optical axis of illumination close enough to the optical axis of the imaging system so that the transmitted light or the specular reflection on the top or the bottom surface of the substrate is collected by the camera.

Alternatively, the at least one light source, for illumination in transmission or in reflection, may be positioned in a dark field configuration with an optical axis of illumination inclined enough relatively to the optical axis of the imaging system so that only the light scattered by the structure is collected by the camera.

The imaging device is advantageously configured to image a precise part of the structure, such as the bottom, or a part of the structure between its top and bottom. This is important, as the dimension of a structure may vary from top to bottom. So, the imaging device is advantageously configured to image only a narrow slice of the structure at a defined depth or longitudinal position, so that the measured lateral data correspond to that slice, and not to an averaged data over a larger part of the structure.

For instance, the imaging device may be configured to have a depth of field smaller than $\frac{1}{5}$ or $\frac{1}{10}$ of the depth of a structure under measurement. This criterion can be for instance applied for measuring HAR structures having a depth of about 50 μm, which leads to a depth of field (DoF) smaller than 5 μm to 10 μm.

According to an example, the imaging device may comprise a confocal imaging arrangement.

Such an arrangement allows for imaging only a very thin layer of the structure.

According to another example, the imaging device may comprise an imaging arrangement with a numerical aperture (NA) at the object equal to or higher than 0.4.

Thus, the imaging device has a very narrow depth of field.

In the configuration of the invention, the image of a slice of the structure is acquired through a thick layer of substrate. For some wafers, for instance, the image may be acquired through a layer of 775 μm of silicon. In that case, it may suffer from optical aberrations, such as spherical aberrations.

So, the imaging device may comprise optical compensation means configured to compensate for aberrations induced by the path of the light through the substrate, such as spherical aberrations.

The imaging device may notably comprise an objective lens with a compensator of spherical aberrations.

Such compensator may be obtained by an optical lens arrangement introducing spherical aberrations opposite to, or compensating, the ones due to a given layer of substrate.

BRIEF DESCRIPTION OF THE DRAWINGS

Other advantages and characteristics will become apparent on examination of the detailed description of an embodiment which is in no way limitative, and the attached figures, where.

DETAILED DESCRIPTION

It is well understood that the embodiments that will be described below are in no way limitative. In particular, it is possible to imagine variants of the invention comprising only a selection of the characteristics described hereinafter, in isolation from the other characteristics described, if this selection of characteristics is sufficient to confer a technical advantage or to differentiate the invention with respect to the state of the prior art. Such a selection comprises at least one, preferably functional, characteristic without structural details, or with only a part of the structural details if this part alone is sufficient to confer a technical advantage or to differentiate the invention with respect to the prior art.

In the FIGURES, elements common to several figures may keep the same reference.

Figure 1:
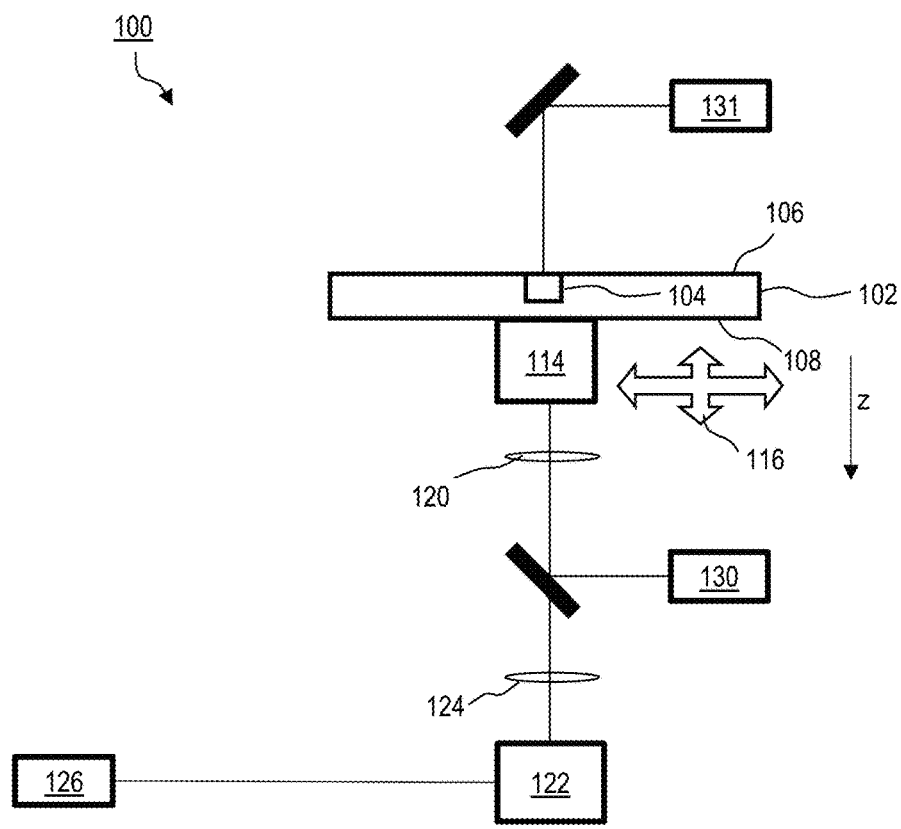
FIG. 1 is a diagrammatic representation of a non-limitative example of a system according to the invention.

FIG. 1 is a diagrammatic representation of a non-limitative example of a system according to the present invention.

The system 100, represented in FIG. 1, may be used to characterise structures, and in particular HAR structures, etched in a substrate, such as a wafer. More particularly, the system 100 may be used to measure a lateral data of structures etched in the substrate.

As represented in FIG. 1, the system 100 is used to characterize structures etched in a substrate 102, such as a wafer. In FIG. 1, for ease of understanding only one structure 104 is represented. Of course, the substrate may comprise more than one structure. The structure 104 may for example be a trench etched in the substrate 102 from the top surface 106 of the substrate 102.

Figure 2A:
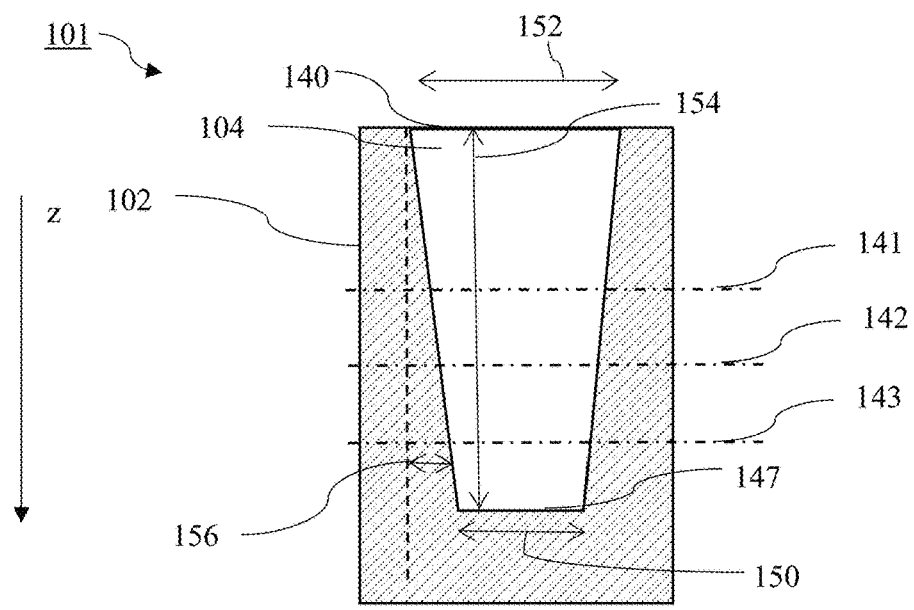
FIGS. 2a and 2b are diagrammatic representations of examples of HAR structures in substrates that may be characterized by means of a method and a system according to the present invention

FIG. 2a illustrates information to be measured of a structure 104 etched in a substrate 102 according to a first example 101. The structure 104 comprises a top 140 and a bottom 147 and is characterized by its depth 154 as well as by its width 150 at the bottom and at the top 152. In the example illustrated, the structure 104 may be for instance a hole or a TSV. The lateral data to be measured, relating to a lateral dimension of the structure, may correspond to the sections or the inner diameters 141, 142, 143 at different depths of the hole or TSV 104. The structure 104 may be also an elongated trench, and the lateral data may correspond to its cross-sections, widths, or transverse dimensions, at different depths of the trench. From the different measurements 141, 142, 143 of lateral data, a longitudinal data, relating to a longitudinal shape of the structure 104, can be determined. In the example represented in FIG. 2a, the longitudinal data corresponds for example to a taper angle 156 of the wall of the structure 104.

Figure 2B:
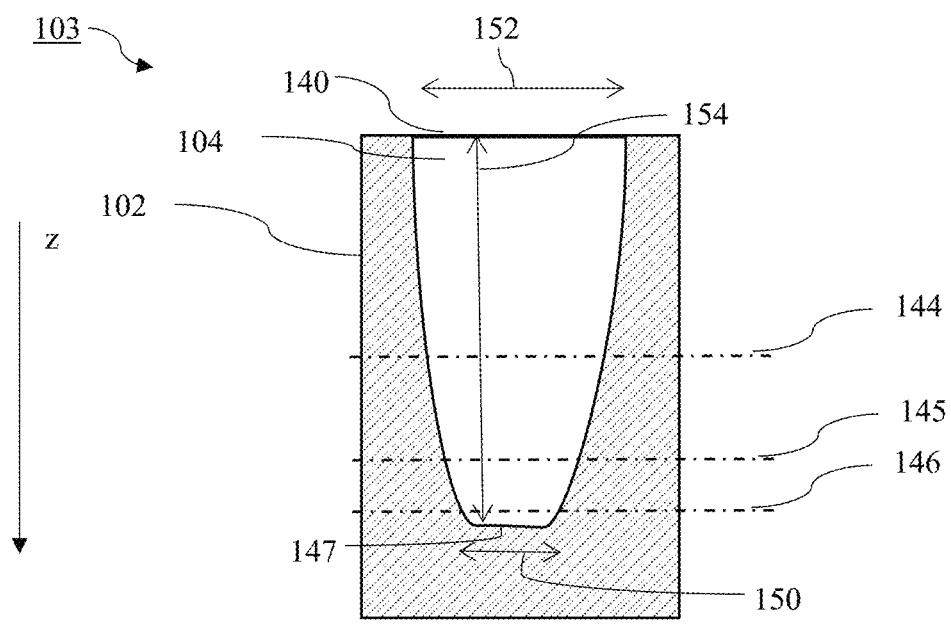

FIG. 2b illustrates information to be measured of a structure etched in a substrate according to a second example 103. The structure 104 may be for instance a hole or a TSV. The lateral data to be measured, relating to a lateral dimension of the structure, may correspond to the sections of the inner diameters 144, 145, 146 at different depths of the hole or TSV 104. The structure 104 may be also an elongated trench, and the lateral data may correspond to its cross-sections, widths, or transverse dimensions, at different depths of the trench. In the example represented in FIG. 2b, the longitudinal data, determined from the different lateral data, corresponds for example to a profile or a shape of the structure 104. Such profile or shape can be acquired along the totality of the depth of the structure or only along a subpart of it such as the bottom.

Referring to FIG. 1, the system 100 comprises an imaging device for acquiring at least one image through the substrate 102 of a structure 104 etched in the substrate 102, and image processing means of said at least one captured image for determining at least one data relative to the structure 104.

The imaging device is positioned on the side of the bottom surface 108 of the substrate 102. As represented in the non-limitative example of FIG. 1, the imaging device comprises a camera 122, a back side lens 120, and a tube lens 124 to image through the bottom surface 108 of the substrate 102 on the camera 122. The camera 122 can be for example a CCD or a CMOS camera.

The imaging device is configured to have a very narrow depth of field, in order to ensure to image only a narrow slice of the structure at the desired depth, so that the measured lateral data correspond to that slice, and not to an averaged data over a larger part of the structure. Therefore, the imaging device uses a back side lens 120 with a numerical aperture (NA) of 0.4 or higher. Examples of such back side lens 120 usable in the device of the invention are a microscope objective with a magnification ×20 and NA=0.45, or a microscope objective with a magnification of ×50, and NA=0.65.

The back side lens 120 also comprises compensation means (not shown) configured to compensate for aberrations, and in particular spherical aberrations induced by the path of the light through the substrate 102. Otherwise, the acquired image may have a degraded resolution, in particular if the image is acquired through a thick layer of substrate, such as for instance 775 μm of silicon. The compensation means may comprise, for example, an optical arrangement which introduces a spherical aberration of opposite effect.

The system 100 also comprises a light source 130 arranged at the back or bottom side of the substrate 102. The wavelength(s) emitted by the light source 130 are adapted to be transmitted through the material of the substrate. For instance, if the substrate is silicon, the light source shall emit light with wavelengths longer than 900 nm or 1000 nm. The light source 130 illuminates the back side of the substrate 102 and thus structures 104 etched in the substrate 102, in reflection.

Alternatively, or in addition, a light source 131 may also be arranged on the top side of the substrate. In this case, the wavelength must also be adapted to be transmitted through the material of the substrate. For instance, if the substrate is silicon, the light source shall emit light with wavelengths longer than 900 nm or 1000 nm. The light source 131 illuminates the top surface 106 of the substrate 102 and thus one or more structures 104 etched in the substrate 102. So, these structures 104 are illuminated in transmission, through the structures themselves and through the surrounding substrate. However, in that configuration the images may be more difficult to interpret, in particular for structures whose lateral dimension shrinks with depth.

The system 100 also comprises positioning means configured for positioning an object plane optically conjugated to an image plane of the imaging device, such as the image plane of the camera, at different depth positions of the structure 102, i.e., at different positions along the z direction. The positioning means may comprise a lens, such as the back-side lens 120, adapted to be moved along the z direction. Alternatively, the positioning means may comprise displacement means adapted for moving the imaging device relatively to the substrate, or the substrate relatively to the imaging device, along the z direction. A focus controller, which may be implemented with a processing module, is used to control the positioning means.

The system 100 also comprises a holder 114, such as a wafer chuck, associated to displacement means 116, such as rotary stages, to move and position the substrate 102 in the x-y, and optionally z, directions.

Figure 3:
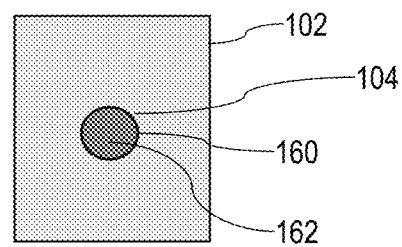
FIG. 3 is a schematic representation of an image of a HAR structure as acquired by the system of the invention.

So, the system 100 is configured to capture/acquire on the camera 122 at least one image of the structure 104 etched in the substrate 102 at a given location or depth along the structure. The location is determined by the position of the object plane optically conjugate to the image plane of the camera. As the optical arrangement has a very small depth of field, the image corresponds essentially to a slice of the structure. FIG. 3 shows an example of such image, acquired with a light source 130 positioned on the back or bottom side of the substrate 102. The structure 104, which is an empty volume within the substrate, reflects nearly no light towards the camera because of its geometry. So, it appears in the image as a darker area 162 compared to the surrounding substrate where light is reflected for instance from the top surface. Thanks to the small depth of field of the imaging system, its section or diameter corresponds to the section or diameter of the structure where the object plane is positioned (for instance location 144, 145 or 146 in FIG. 2b). It should be noted that FIG. 3 represents only one structure in the field of view but, depending on the layout of the substrate, several structures can be present in that field of view. In that case they can be acquired and processed simultaneously by the system of the invention.

The image obtained with the camera is then processed by a processing module 126, for measuring a lateral data relative to a lateral dimension of the structure 104. The processing module 126 may be a hardware module, such as a processor or a chip, or a software module such as a computer program. The processing consists mainly in identifying the location of the walls 160 of the structure, which can be defined as the transition between the interior 162 of the structure and the surrounding substrate. This can be achieved using well-known image processing techniques such as segmentation, based for instance on a gray level analysis, and/or a pattern detection to identify the structure in the image. Then, when the structure is identified or segmented, lateral data can be obtained with any dimension/shape measurement technique or blob analysis.

The system 100 may be implemented in a method according to the invention, in order to characterize structures, and in particular HAR structures, etched in a substrate.

Figure 4:
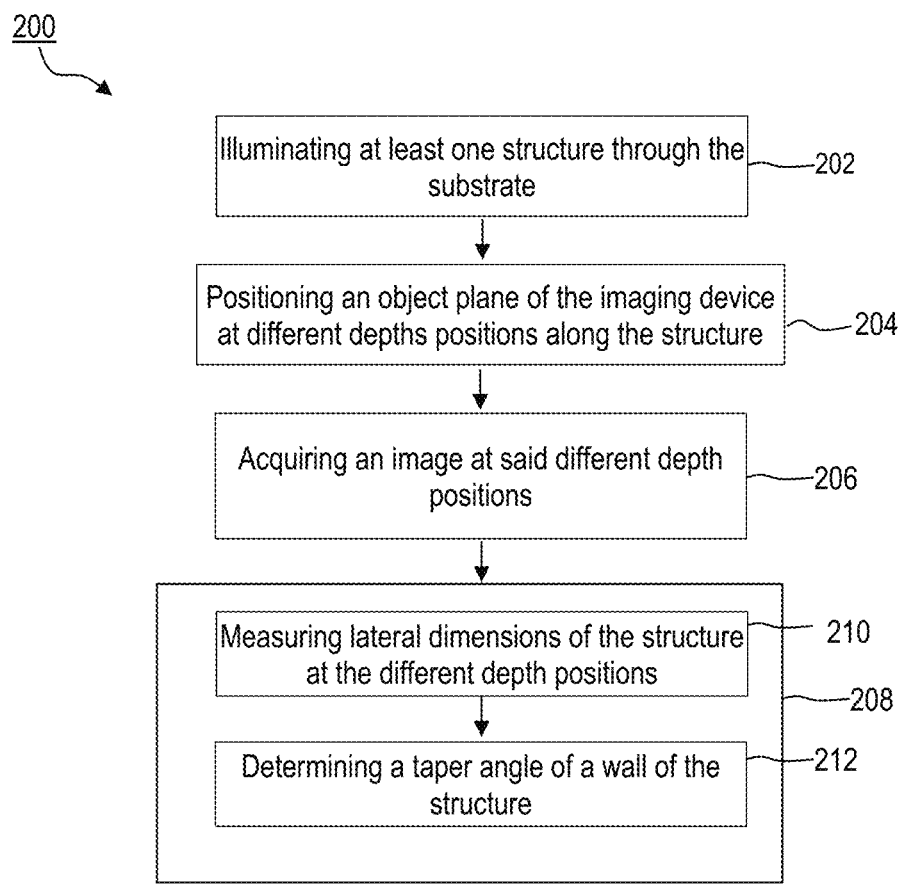
FIGS. 4-5 are diagrammatic representations of non-limitative examples of a method according to the invention.

FIG. 4 is a diagrammatic representation of a non-limitative example of a method according to the present invention. The method may be carried out by a system according to the invention, and in particular the system 100 as represented in FIG. 1.

The method 200, shown in FIG. 4, may be used to characterise structures, and in particular high aspect ratio, HAR, structures etched in a substrate, such as a wafer. More particularly, the method 200 of FIG. 4 may be used to measure a longitudinal data of a structure etched in the substrate.

The method 200 comprises a step 202 of illuminating at least one structure etched in the substrate. The illumination may be realized by means of a light source positioned on a bottom side, and/or possibly on a top side, of the substrate, and of which the emitted light has a wavelength adapted to be transmitted through the substrate.

Following the illuminating step 202, the method 200 comprises a positioning step 204, during which an object plane of the imaging device is positioned at at least two different depth positions $z_1$, $z_2$ along the structure 104. For this, the object plane is moved along the z direction, for example by moving a lens, such as the back-side lens 120 of FIG. 1, or the imaging device and the substrate relatively to each other, along the z direction. The at least two depths positions $z_1$, $z_2$ may, for example, correspond to at least two of the positions 141, 142, 143 along the structure 104 as represented in FIG. 2a.

Once the object plane of the imaging device positioned at a depth position, the method comprises an image acquisition step 206 executed for each of the depth positions, $z_1$, $z_2$. So, at least one image of the structure is captured by the imaging device through the substrate for each of the depth positions, $z_1$, $z_2$.

The images are further processed, in a processing phase 208.

In order to obtain a lateral data of the structure at the at least two depth positions, the processing phase 208 comprises a lateral data measuring step 210. This step 210 may comprise a step of identifying the region of the image corresponding to the interior and/or wall(s) of the structure, and doing measurements on them, as previously described.

The lateral data thus obtained comprise an information relating to a lateral dimension of the structure, such as to a diameter or a section of a hole or a via (TSV), or to the width of a trench.

So, lateral data or dimensions are obtained for the respective depth positions at which the images were acquired.

Following the lateral data measuring step 210, the processing phase 208 of the method 200 comprises a longitudinal data determining step 212.

The longitudinal data comprise an information relating to a longitudinal dimension or a longitudinal shape of the structure. The longitudinal data are determined from the lateral data measured in the previous step 210 for at least two depth positions $z_1$, $z_2$ of the structure.

According to the embodiment represented in FIG. 4, the longitudinal data which is sought correspond to a taper angle of at least one lateral wall of the structure, along the totality or a part of the structure. In that case the hypothesis or the approximation is made that the walls of the structure are straight. The taper angle can then be easily obtained from at least two measurements of the cross section or diameter at two different depths positions along the structure. That taper angle is a valuable information for the monitoring of the etching process. It also has the advantage that it does not require to know precisely the location of the depth positions used with respect to the top surface of the substrate or the bottom of the structure, but only the distance $z_d$ separating these depth positions, which is much easier to obtain.

Figure 5:
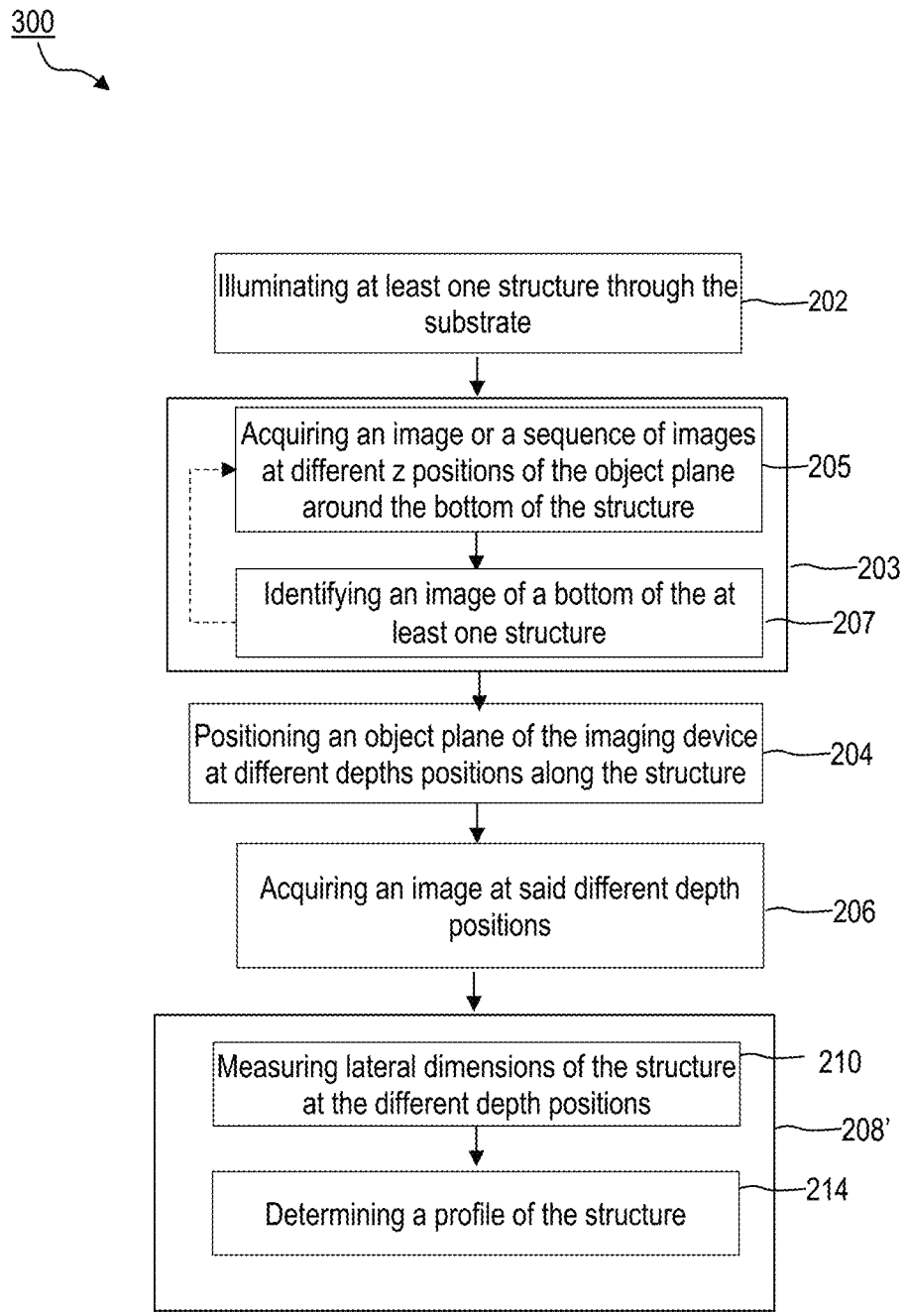

FIG. 5 is a diagrammatic representation of another non-limitative example of a method according to the present invention.

The method 300, shown in FIG. 5, may be used to measure or characterize structures, such as HAR structures, etched in a substrate, such as a wafer. More particularly, the method 300 of FIG. 5 may be used to measure a longitudinal data of a structure, in particular HAR structure, etched in the substrate.

The method 300 comprises an illuminating step 202, positioning steps 204, image acquisition steps 206, and an image processing phase 208, as described with reference to FIG. 3.

The method 300 according to the embodiment represented in FIG. 5 comprises also a bottom image acquisition step 203 whose purpose is to locate the bottom of the structure with the imaging system. The goal can be to measure a lateral data precisely at the bottom of the structure, and/or to locate in depth that bottom, for instance to measure the structure depth or to serve as reference of depth positions.

During the bottom image acquisition step 203, at least one image of the bottom of the structure is captured by the imaging device. The bottom image acquisition step 203 comprises an acquisition step 205 for acquiring one image, or a sequence of images, of the bottom of the structure, with the object plane positioned at the bottom or at different z positions around the bottom of the structure. For this, the object plane is moved along the z direction, for example by moving a lens, such as the back-side lens 120 of FIG. 1, or the imaging device and the substrate relatively to each other, along the z direction.

The bottom image acquisition step 203 also comprises an identification step 207, in which an image of the bottom of the structure is identified among the sequence of acquired images, or validated if only one image is acquired. This identification may be realised according to known image processing techniques.

According to an embodiment, it comprises steps of:
identifying the images displaying the structure among the images of a sequence to distinguish them from the images acquired for object planes located in the substrate below the structure, in which the structure is out of focus. This may be done using image processing techniques such as image segmentation, feature extraction or blob analysis, to locate structures in the acquired images. This may also be done by comparison with known reference images, possibly using a deep learning based technique.
identifying the images in the sequence of images corresponding to the transition in z between the at least one structure and the substrate below it;
finding the image in the transition area displaying the structure and possibly matching (at best) some quality criteria such as a sharpness or a content in high spatial frequencies, which image may be considered as the best representation of the bottom of the structure, or the image acquired for an object plane coinciding with the bottom of the structure.

Thanks also to the small depth of field of the imaging system, it is sure then that the image identified that way is displaying the bottom of the structure, and not another part of the structure.

According to an example, the object plane is moved during step 205 through the substrate, starting from the bottom surface of the substrate, until a bottom of a structure appears in the acquired images. The bottom surface of the substrate has the advantage of being a surface easy to find in the images. Then, in step 207, the image displaying the best representation of the bottom of the structure is identified as explained above.

According to another example, the object plane is moved during step 205 through a structure, starting for instance from the top surface of the substrate, until the structure disappears from the images. Then, in step 207, the image displaying the best representation of the bottom of the structure is identified as explained above.

According to another example, a much narrower z scanning range positioned around a pre-identified bottom position of the structure may be used. For that, an a priori knowledge of the depth of the structure, even approximate, is used. That information can be for instance a nominal or expected depth, known by design. It can also be obtained by measuring the depth of the structure using for instance an interferometer. The depth information allows locating the bottom of the structure relative to the top surface of the substrate. In addition, a total thickness of the substrate can also be used, which can be derived also from design information or thickness measurements, for instance with an interferometer. In that case, the bottom of the structure can also be located with respect to the bottom side of the substrate. This method allows faster and also more accurate measurements, in particular by limiting the risk of false detection of the bottom.

According to yet another example, using also a priori knowledge of the location of the bottom obtained as explained previously, one image is acquired at step 205 directly at the estimated location of the bottom. It is then validated at step 207 as explained before, by locating the structure and checking quality criteria. If the image does not satisfy some criteria, another image may be acquired for another z in the neighborhood, and analyzed, and so on, until an image matching the quality criteria is found. In that case a scanning strategy based on the evolution of some criteria of the images in a neighborhood may be implemented to optimize the scanning procedure.

The method 300 according to the embodiment of FIG. 5 then continues with the positioning steps 204 and image acquisition steps 206 as detailed with reference to the method 200 of FIG. 4. Starting for instance from the bottom of the structure, images of the structure are thus acquired at various depths positions. The depth positions may, for example, correspond to the positions 144, 145, 146 along the structure 104 as represented in FIG. 2b.

Once at least one image of the structure is captured at the bottom of the structure and several depth positions, the images are processed, in a processing phase 208'. The processing phase 208' comprises a lateral data measuring step 210, similarly to the method 200 according to the embodiment of FIG. 4.

According to the embodiment represented in FIG. 5, the processing phase 208' comprises a longitudinal data determining step 214 according to which a longitudinal data corresponding to a profile of the structure or a part of the structure is determined. That profile is directly obtained from the lateral data obtained at the respective z positions. This allows for instance the measurement of a profile of a structure having non-straight or curvy walls, or more accurate measurement of the longitudinal shape of the structure, in its totality or in a subpart for instance close to the bottom.

According to some embodiments, the method 300 may be executed without the bottom image acquisition step 203, which is then optional. The reference of the depth positions z may be sought in another way, for instance by locating the top surface of the substrate with the imaging system 100, or by using a-priori knowledge. A profile can also be obtained at step 214 at least in a part of the structure by using several lateral data obtained at several z positions whose only relative position is known.

Of course, the invention is not limited to the examples detailed above.

While a particular embodiment of the present method and a system for characterizing structures through a substrate, have been described herein, it will be appreciated by those skilled in the art that changes and modifications may be made thereto without departing from the invention in its broader aspects and as set forth in the following claims.

The invention claimed is:

1. A method for characterizing a structure etched in a first surface of a substrate, such as a wafer, said structure extending along a longitudinal direction, z, into the substrate, the method being implemented by a characterizing system comprising a light source configured to emit an illumination beam with a wavelength adapted to be transmitted through the substrate, and an imaging device positioned to face a second surface of the substrate opposite to the first surface, the method comprising the following steps:
   illuminating at least one structure with the illumination beam;
   subsequently positioning an object plane of the imaging device at at least two different longitudinal positions;
   acquiring at least one image of the structure at each of the longitudinal positions, the images being acquired through the substrate;
   measuring at least one lateral data relating to a lateral dimension of the structure from the at least one acquired image at each of the longitudinal positions; and
   determining at least one longitudinal data relating to a longitudinal shape of the structure from the lateral data of at least two longitudinal positions.

2. The method according to claim 1, characterized in that the step of determining at least one longitudinal data comprises a step of determining a taper angle of at least one lateral wall of the at least one structure.

3. The method according to claim 1, characterized in that the step of determining at least one longitudinal data comprises a step of determining a profile of the at least one structure in the longitudinal plane.

4. The method according to claim 3, characterized in it further comprises a step of positioning the object plane of the imaging device at a bottom of the at least one structure.

5. The method according to claim 4, characterized in that it further comprises:
   moving the object plane along the z direction;
   acquiring an image or a sequence of images of the object plane at different positions of the object plane along the z direction; and
   identifying at least one image of the bottom or the top of the at least one structure, acquired with the object plane positioned at the bottom or the top of the at least one structure.

6. The method according to claim 5, characterized in that the step of identifying at least one image of the bottom or the top comprises at least one of the following steps:
   detecting a transition in the sequence of images between the at least one structure and the environment of the structure,
   measuring the sharpness or the local spatial frequencies of the acquired images.

7. The method according to claim 3, characterized in that it further comprises a step of positioning the object plane of the imaging device at a top of the at least one structure.

8. The method according to claim 1, characterized in that the step of measuring at least one lateral data comprises a step of identifying in said at least one image of the structure at least one of the following: an area corresponding to the interior of the structure, a location of its walls, a transition between the structure and the substrate.

9. A system for characterizing a structure etched in a first surface of a substrate, such as a wafer, said structure extending along a longitudinal direction, z, into the substrate, the system comprising:
- at least one light source for illuminating the structure, the at least one light source emitting light of a wavelength adapted to be transmitted through the substrate;
- an imaging device positioned to face a second surface of the substrate opposite to the first surface;
- a focus controller for subsequently positioning an object plane of the imaging device at at least two different longitudinal positions, and acquiring with the imaging device at least one image of the structure at each of the longitudinal positions through the substrate; and;
- an image processing device for:
  - measuring at least one lateral data relating to a lateral dimension of the at least one structure from the at least one acquired image at each of the longitudinal positions; and
  - determining at least one longitudinal data relating to a longitudinal shape of the at least one structure from the lateral data of at least two longitudinal positions.

10. The system according to claim 9, characterized in that the at least one light source is positioned to face the second surface of the substrate.

11. The system according to claim 9, characterized in that the at least one light source is positioned to face the first surface of the substrate.

12. The system according to claim 9, characterized in that the imaging device comprises a camera and optical imaging lenses.

13. The system according to claim 9, characterized in that the imaging device comprises a confocal imaging arrangement.

14. The system according to claim 9, characterized in that the imaging device comprises an imaging arrangement with a numerical aperture at the object equal to or higher than 0.4.

15. The system according to claim 9, characterized in that the imaging device comprises an objective lens with a compensator of spherical aberrations.

* * * * *